(12) United States Patent
Guo

(10) Patent No.: US 12,222,471 B2
(45) Date of Patent: Feb. 11, 2025

(54) CAMERA OPTICAL LENS

(71) Applicant: AAC Optics (Suzhou) Co., Ltd., Suzhou (CN)

(72) Inventor: Zhanli Guo, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 536 days.

(21) Appl. No.: 17/562,044

(22) Filed: Dec. 27, 2021

(65) Prior Publication Data

US 2023/0085929 A1  Mar. 23, 2023

(30) Foreign Application Priority Data

Sep. 23, 2021 (CN) .......................... 202111114437.4

(51) Int. Cl.
*G02B 13/00* (2006.01)
*G02B 9/60* (2006.01)
*G02B 27/00* (2006.01)

(52) U.S. Cl.
CPC .......... *G02B 13/0045* (2013.01); *G02B 9/60* (2013.01); *G02B 27/0025* (2013.01)

(58) Field of Classification Search
CPC ................ G02B 13/0045; G02B 13/02; G02B 13/0065; G02B 9/60; G02B 9/62; G02B 9/64; G02B 27/0025; G03B 30/00
See application file for complete search history.

(56) References Cited

U.S. PATENT DOCUMENTS

| 2014/0049843 | A1* | 2/2014 | Kubota | .................... G02B 9/62 |
| | | | | 359/757 |
| 2018/0180856 | A1* | 6/2018 | Jung | .................. G02B 13/0045 |
| 2019/0196142 | A1* | 6/2019 | Shi | ............................ G02B 9/60 |
| 2021/0063703 | A1* | 3/2021 | Byun | ..................... H04N 23/57 |
| 2022/0011550 | A1* | 1/2022 | Yu | ...................... G02B 13/0045 |

* cited by examiner

*Primary Examiner* — George G. King
*Assistant Examiner* — Anna Smith
(74) *Attorney, Agent, or Firm* — W&G Law Group

(57) ABSTRACT

The present invention discloses a camera optical lens including, from an object side to an image side in sequence, a first lens having a positive refractive power, a second lens having a negative refractive power, a third lens having a negative refractive power, a fourth lens having a positive refractive power, and a fifth lens having a refractive power. The camera optical lens satisfies the following conditions: $8.00 \leq f$, $0.90 \leq f/TTL$, $0.40 \leq f1/f \leq 0.85$, $-1.10 \leq f3/f4 \leq -0.40$, and $0.30 \leq d2/d4 \leq 2.00$. The camera optical lens has large aperture, long focal length and small distortion.

9 Claims, 12 Drawing Sheets

CAMERA OPTICAL LENS

FIELD OF THE PRESENT INVENTION

The present invention relates to the field of optical lens, and more particularly, to a camera optical lens suitable for handheld terminal devices, such as smart phones and digital cameras, monitors or PC lenses.

DESCRIPTION OF RELATED ART

In recent years, with the rise of various smart devices, the demand for miniaturized camera optics has been increasing, and the pixel size of photosensitive devices has shrunk, coupled with the development trend of electronic products with good functions, thin and portable appearance, Therefore, miniaturized imaging optical lenses with good image quality have become the mainstream in the current market. In order to obtain a better imaging quality, a multi-piece lenses structure is often used. Moreover, with the development of technology and the increase of diversified needs of users, as the pixel area of the photosensitive device continues to shrink and the system's requirements for image quality continue to increase, the five-piece lenses structure gradually appears in the lens design. There is an urgent need for a long focal length imaging lens with excellent optical characteristics, small distortion, and fully corrected aberrations.

SUMMARY

In the present invention, a camera optical lens has excellent optical characteristics with large aperture, long focal length and small distortion.

According to one aspect of the present invention, a camera optical lens with six-piece lenses comprises, from an object side to an image side in sequence, a first lens having a positive refractive power, a second lens having a negative refractive power, a third lens having a negative refractive power, a fourth lens having a positive refractive power, and a fifth lens having a refractive power. The camera optical lens satisfies the following conditions: $8.00 \leq f$, $0.90 \leq f/TTL$, $0.40 \leq f1/f \leq 0.85$, $-1.10 \leq f3/f4 \leq -0.40$, and $0.30 \leq d2/d4 \leq 2.00$. f denotes a focal length of the camera optical lens, f1 denotes a focal length of the first lens, f3 denotes a focal length of the third lens, f4 denotes a focal length of the fourth lens, d2 denotes an on-axis distance from an image side surface of the first lens to an object side surface of the second lens, and d4 denotes an on-axis distance from an image side surface of the second lens to an object side surface of the third lens.

As an improvement, the camera optical lens satisfies the following condition: $9.00 \leq R6/R5 \leq 30.00$. R5 denotes a central curvature radius of the object side surface of the third lens, and R2 denotes a central curvature radius of an image side surface of the third lens.

As an improvement, the first lens has an object side surface being convex in a paraxial region and the image side surface of the first lens is convex in the paraxial region. The camera optical lens further satisfies the following conditions: $-1.72 \leq (R1+R2)/(R1-R2) \leq -0.48$, and $0.07 \leq d1/TTL \leq 0.25$. R1 denotes a central curvature radius of the object side surface of the first lens, R2 denotes a central curvature radius of the image side surface of the first lens, d1 denotes an on-axis thickness of the first lens, and TTL denotes a total optical length from the object side surface of the first lens of the camera optical lens to an image surface of the camera optical lens along an optical axis.

As an improvement, the object side surface of the second lens is convex in a paraxial region and the image side surface of the second lens is concave in the paraxial region. The camera optical lens further satisfies the following conditions: $-1.34 \leq f2/f \leq -0.40$, $1.17 \leq (R3+R4)/(R3-R4) \leq 3.84$, and $0.01 \leq d3/TTL \leq 0.05$. f2 denotes a focal length of the second lens, R3 denotes a central curvature radius of the object side surface of the second lens, R4 denotes a central curvature radius of the image side surface of the second lens, d3 denotes an on-axis thickness of the second lens, and TTL denotes a total optical length from an object side surface of the first lens of the camera optical lens to an image surface of the camera optical lens along an optical axis.

As an improvement, the object side surface of the third lens is concave in a paraxial region, and the third lens has an image side surface being convex in the paraxial region. The camera optical lens further satisfies the following conditions: $-5.58 \leq f3/f \leq -1.33$ and $0.02 \leq d5/TTL \leq 0.07$. d5 denotes an on-axis thickness of the third lens.

As an improvement, the fourth lens has an object side surface being concave in a paraxial region, and an image side surface being convex in the paraxial region. The camera optical lens further satisfies the following conditions: $1.27 \leq f4/f \leq 7.43$, $4.43 \leq (R7+R8)/(R7-R8) \leq 48.10$, and $0.05 \leq d7/TTL \leq 0.16$. R7 denotes a central curvature radius of the object side surface of the fourth lens, R8 denotes a central curvature radius of the image side surface of the fourth lens, d7 denotes an on-axis thickness of the fourth lens, and TTL denotes a total optical length from an object side surface of the first lens of the camera optical lens to an image surface of the camera optical lens along an optical axis.

As an improvement, the fifth lens has an object side surface being concave in a paraxial region, an image side surface being convex in the paraxial region. The camera optical lens further satisfies the following conditions: $-5.60 \leq f5/f \leq -0.79$, $-4.43 \leq (R9+R10)/(R9-R10) \leq -0.72$, and $0.03 \leq d9/TTL \leq 0.16$. f5 denotes a focal length of the fifth lens, R9 denotes a central curvature radius of the object side surface of the fifth lens, R10 denotes a central curvature radius of the image side surface of the fifth lens, d9 denotes an on-axis thickness of the fifth lens, and TTL denotes a total optical length from an object side surface of the first lens of the camera optical lens to an image surface of the camera optical lens along an optical axis.

As an improvement, the camera optical lens further satisfies the following condition: $f/IH \geq 4.00$. IH denotes an image height of the camera optical lens.

As an improvement, the camera optical lens further comprise a reflecting surface arranged at an end of the first lens away from the second lens, the reflecting surface is configured for reflecting and deflecting an entry light.

As an improvement, the reflecting surface is formed by a prism.

BRIEF DESCRIPTION OF THE DRAWINGS

In order to explain the technical solutions in the embodiments of the present invention more clearly, the following will briefly introduce the drawings that need to be used in the description of the embodiments. Obviously, the drawings in the following description are only some embodiments of the present invention. For those of ordinary skill in the art, without creative work, other drawings can be obtained based on these drawings, among which.

DETAILED DESCRIPTION OF THE EXEMPLARY EMBODIMENTS

In order to make the objects, technical solutions, and advantages of the present invention more apparent, the embodiments of the present invention will be described in detail below. However, it will be apparent to the one skilled in the art that, in the various embodiments of the present invention, a number of technical details are presented in order to provide the reader with a better understanding of the invention. However, the technical solutions claimed in the present invention can be implemented without these technical details and various changes and modifications based on the following embodiments.

Embodiment 1

Figure 1:
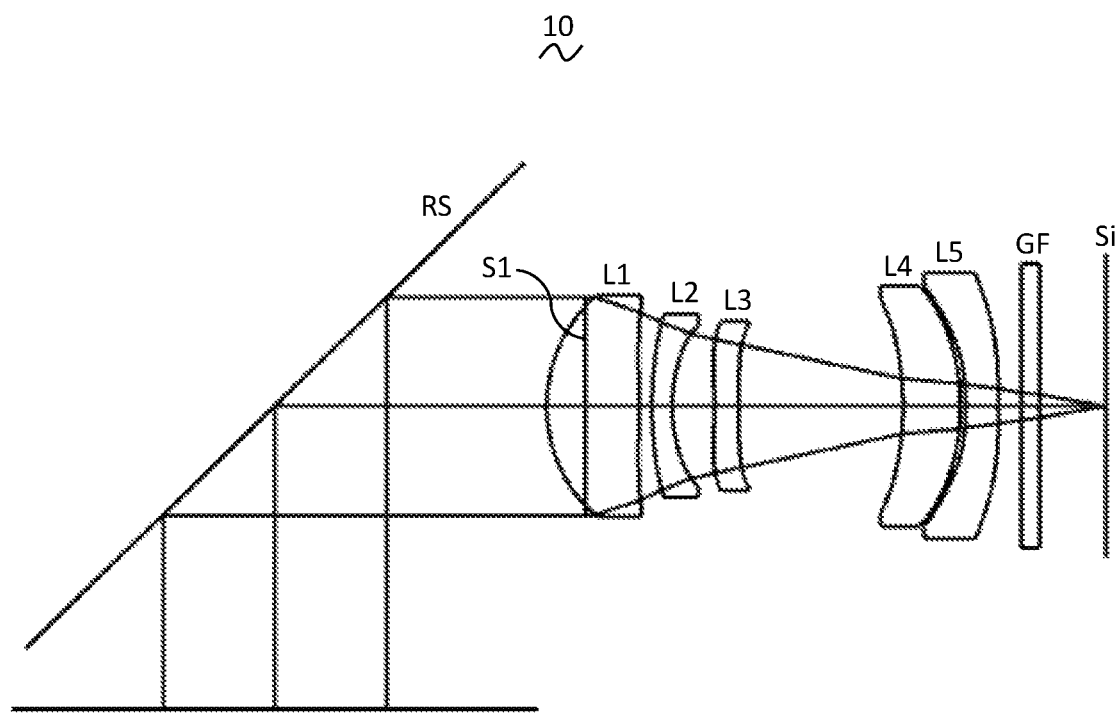
FIG. 1 is a schematic diagram of a structure of a camera optical lens in accordance with Embodiment 1 of the present invention.

As referring to the accompanying drawings, the present invention provides a camera optical lens 10. FIG. 1 shows the camera optical lens 10 according to embodiment 1 of the present invention. The camera optical lens 10 comprises five-piece lenses. Specifically, from an object side to an image side, the camera optical lens 10 comprises in sequence: an aperture S1, a first lens L1, a second lens L2, a third lens L3, a fourth lens L4, and a fifth lens L5. Optical elements like optical filter GF can be arranged between the fifth lens L5 and an image surface Si. In other embodiment, a reflective surface RS is arranged at an end of the first lens L1 away from the second lens L2. The reflective surface RS is configured for reflecting and deflecting an entry light so that a periscope optical system is formed. The reflective surface RS is formed by a prism or a reflector mirror.

The first lens L1 is made of plastic material, the second lens L2 is made of plastic material, the third lens L3 is made of plastic material, the fourth lens L4 is made of plastic material, the fifth lens L5 is made of plastic material. In other optional embodiments, each lens may also be made of other materials, such as glasses.

In the present embodiment, a focal length of the camera optical lens 10 is defined as f. The camera optical lens 10 satisfies the following condition: 8.00≤f. The condition specifies the focal length f of the camera optical lens 10. With such configuration, the camera optical lens 10 has a long-focal-length effect.

The focal length of the camera optical lens 10 is defined as f, a total optical length from an object side surface of the first lens of the camera optical lens to an image surface of the camera optical lens along an optical axis is defined as TTL, the following condition is satisfied: 0.90≤f/TTL. The condition specifies a ratio of the focal length f of the camera optical lens 10 to the total optical length TTL from the object side surface of the first lens of the camera optical lens to the image surface of the camera optical lens along the optical axis. When some camera optical lenses have the same optical length, the camera optical lens 10 in the present invention has longer focal length. Preferably, the camera optical lens 10 further meets the following condition: 0.98≤f/TTL.

The focal length of the camera optical lens 10 is defined as f, a focal length of the first lens L1 is defined as f1, the camera optical lens 10 meets the following condition: 0.40≤f1/f≤0.85, which specifies a ratio of the focal length f1 of the first lens L1 to a focal length f of the camera optical lens 10. When the above condition is satisfied, an amount of the field curvature of the camera optical lens 10 can be effectively balanced so that an offset amount of the field curvature of a center field lower than 0.01 mm. Preferably, the camera optical lens 10 further meets the following condition: 0.40≤f1/f≤0.64.

A focal length of the third lens L3 is defined as f3, a focal length of the fourth lens L4 is defined as f4. The camera optical lens 10 meets the following condition: −1.10≤f3/f4≤−0.40, which specifies a ratio of the focal length f3 of the third lens L3 to the focal length f4 of the fourth lens L4. It is beneficial for correcting astigmatism and distortion of the camera optical lens 10, so that |Distortion|≤1.10% and brightness or saturation can be maintained, with the focal length reasonable distributed.

An on-axis distance from an image side surface of the first lens L1 to an object side surface of the second lens L2 is defined as d2; an on-axis distance from an image side surface of the second lens L2 to an object side surface of the third lens L3 is defined as d4. The camera optical lens satisfies the following condition: 0.30≤d2/d4≤2.00. The condition specifies a ratio of the on-axis distance d2 to the on-axis distance d4, within the range of the condition, it is beneficial for reducing the total optical length TTL and realizing an ultra-thin effect.

A central curvature radius of the object side surface of the third lens L3 is defined as R5, and a central curvature radius of the image side surface of the third lens L3 is defined as R6. The camera optical lens 10 further satisfies the following condition: 9.00≤R6/R5≤30.00. The condition specifies a shape of the third lens L3, which can reduce a deflection of light and effectively correct a chromatic aberration, so that the chromatic aberration |LC|≤2.5 μm. Preferably, the camera optical lens 10 further meets the following condition: 9.44≤R6/R5≤28.60.

In the present embodiment, the object side surface of the first lens L1 is convex in a paraxial region, the image side surface of the first lens L1 is convex in the paraxial region, and the first lens L1 has a positive refractive power. In other optional embodiments, the object side surface and the image side surface of the first lens L1 can also be arranged as other concave side surface or convex side surface, such as, concave object side surface and concave image side surface and so on.

A central curvature radius of the object side surface of the first lens L1 is defined as R1, and a central curvature radius of the image side surface of the first lens L1 is defined as R2. The camera optical lens 10 further satisfies the following condition: $-1.72 \leq (R1+R2)/(R1-R2) \leq -0.48$. This condition reasonably controls a shape of the first lens L1, so that the first lens L1 can effectively correct a spherical aberration of the camera optical lens 10. Preferably, the following condition shall be satisfied, $-1.07 \leq (R1+R2)/(R1-R2) \leq -0.60$.

An on-axis thickness of the first lens L1 is defined as d1. The total optical length from the object side surface of the first lens L1 to the image surface Si of the camera optical lens 10 along the optical axis is defined as TTL. The camera optical lens 10 further satisfies the following condition: $0.07 \leq d1/TTL \leq 0.25$. When the value is within this range, it is beneficial for producing the ultra-thin camera optical lens 10. Preferably, the following condition shall be satisfied, $0.12 \leq d1/TTL \leq 0.20$.

In the present embodiment, the object side surface of the second lens L2 is convex in the paraxial region, the image side surface of the second lens L2 is concave in the paraxial region, and the second lens L2 has a negative refractive power. In other optional embodiments, the object side surface and the image side surface of the second lens L2 can also be arranged as other concave side surface or convex side surface, such as, concave object side surface and convex image side surface and so on.

The focal length of the camera optical lens 10 is defined as f, and a focal length of the second lens L2 is defined as f2. The camera optical lens 10 further satisfies the following condition: $-1.34 \leq f2/f \leq -0.40$. It is beneficial for correcting an aberration of the camera optical lens 10 by controlling the positive refractive power of the second lens L2 being within reasonable range. Preferably, the following condition shall be satisfied, $-0.84 \leq f2/f \leq -0.50$.

A central curvature radius of the object side surface of the second lens L2 is defined as R3, and a central curvature radius of the image side surface of the second lens L2 is defined as R4. The camera optical lens 10 further satisfies the following condition: $1.17 \leq (R3+R4)/(R3-R4) \leq 3.84$, which specifies a shape of the second lens L2. When the condition is satisfied, as the camera optical lens 10 develops toward the ultra-thin and wide-angle lenses, it is beneficial for correcting an on-axis chromatic aberration. Preferably, the following condition shall be satisfied, $1.86 \leq (R3+R4)/(R3-R4) \leq 3.08$.

An on-axis thickness of the second lens L2 is defined as d3. The total optical length from the object side surface of the first lens L1 to the image surface Si of the camera optical lens 10 along the optical axis is defined as TTL. The camera optical lens 10 further satisfies the following condition: $0.01 \leq d3/TTL \leq 0.05$. When the value is within this range, it is beneficial for producing the ultra-thin camera optical lenses. Preferably, the following condition shall be satisfied, $0.01 \leq d3/TTL \leq 0.04$.

In the present embodiment, the object side surface of the third lens L3 is concave in the paraxial region, an image side surface of the third lens L3 is convex in the paraxial region, and the third lens L3 has a negative refractive power. In other optional embodiments, the object side surface and the image side surface of the third lens L3 can also be arranged as other concave side surface or convex side surface, such as, convex object side surface and concave image side surface and so on.

The focal length of the camera optical lens 10 is defined as f, and a focal length of the third lens L3 is defined as f3. The camera optical lens 10 further satisfies the following condition: $-5.58 \leq f3/f \leq -1.33$. By a reasonable distribution of the refractive power, which makes it is possible that the camera optical lens 10 has a higher imaging quality and a lower sensitivity. Preferably, the following condition shall be satisfied, $-3.49 \leq f3/f \leq -1.66$.

An on-axis thickness of the third lens L3 is defined as d5. The total optical length from the object side surface of the first lens L1 to the image surface Si of the camera optical lens 10 along the optical axis is defined as TTL. The camera optical lens 10 further satisfies the following condition: $0.02 \leq d5/TTL \leq 0.07$, which benefits for realizing the ultra-thin effect. Preferably, the following condition shall be satisfied, $0.03 \leq d5/TTL \leq 0.06$.

In the present embodiment, an object side surface of the fourth lens L4 is concave in a paraxial region, an image side surface of the fourth lens L4 is convex in the paraxial region, and the fourth lens L4 has a positive refractive power. In other optional embodiments, the object side surface and the image side surface of the fourth lens L4 can also be arranged as other convex side surface or concave side surface, such as, convex object side surface and concave image side surface and so on.

The focal length of the camera optical lens 10 is defined as f, and a focal length of the fourth lens L4 is defined as f4. The camera optical lens 10 further satisfies the following condition: $1.27 \leq f4/f \leq 7.43$. It is beneficial for realizing the excellent imaging quality and the lower sensitivity by controlling the refractive power being within reasonable range. Preferably, the following condition shall be satisfied, $2.03 \leq f4/f \leq 5.95$.

A curvature radius of the object side surface of the fourth lens L4 is defined as R7, and a central curvature radius of the image side surface of the fourth lens L4 is defined as R8. The camera optical lens further satisfies the following condition: $4.43 \leq (R7+R8)/(R7-R8) \leq 48.10$, which specifies a shape of the fourth lens L4. When the condition is satisfied, as the s development of the ultra-thin lenses, it is beneficial for solving the problems, such as correcting an off-axis aberration. Preferably, the following condition shall be satisfied, $7.09 \leq (R7+R8)/(R7-R8) \leq 38.48$.

An on-axis thickness of the fourth lens L4 is defined as d7. The total optical length from the object side surface of the first lens L1 to the image surface Si of the camera optical lens 10 along the optical axis is defined as TTL. The camera optical lens 10 further satisfies the following condition: $0.05 \leq d7/TTL \leq 0.16$, which is beneficial for realizing the ultra-thin effect. Preferably, the following condition shall be satisfied, $0.08 \leq d7/TTL \leq 0.12$.

In the present embodiment, an object side surface of the fifth lens L5 is concave in the paraxial region, an image side surface of the fifth lens L5 is convex in the paraxial region, and the fifth lens L5 has a negative refractive power. In other optional embodiments, the object side surface and the image side surface of the fifth lens L5 can also be arranged as other convex side surface or concave side surface, such as, convex object side surface and concave image side surface and so on. The fifth lens L5 may have a positive refractive power.

The focal length of the camera optical lens 10 is defined as f, and a focal length of the fifth lens L5 is defined as f5. The camera optical lens 10 further satisfies the following condition: $-5.60 \leq f5/f \leq -0.79$. When the condition is satisfied, a light angle of the camera optical lens 10 can be smoothed effectively and a sensitivity of the tolerance can be reduced. Preferably, the following condition shall be satisfied, $-3.50 \leq f5/f \leq -0.99$.

A central curvature radius of the object side surface of the fifth lens L5 is defined as R9, and a central curvature radius of the image side surface of the fifth lens L5 is defined as R10. The camera optical lens further satisfies the following condition: $-4.43 \leq (R9+R10)/(R9-R10) \leq -0.72$, which specifies a shape of the fifth lens L5. When the value is within this range, as the development of the ultra-thin and wide-angle lenses, it is beneficial for correcting the off-axis aberration. Preferably, the following condition shall be satisfied, $-2.77 \leq (R9+R10)/(R9-R10) \leq -0.90$.

An on-axis thickness of the fifth lens L5 is defined as d9. The total optical length from the object side surface of the first lens L1 to the image surface Si of the camera optical lens 10 along the optical axis is defined as TTL. The camera optical lens 10 further satisfies the following condition: $0.03 \leq d9/TTL \leq 0.16$. When the condition is satisfied, it is beneficial for realizing the ultra-thin effect. Preferably, the following condition shall be satisfied, $0.05 \leq d9/TTL \leq 0.13$.

In the present embodiment, the focal length of the camera optical lens 10 is f, and a combined focal length of the first lens L1 and the second lens L2 is defined as f12. The camera optical lens 10 further satisfies the following condition: $0.35 \leq f12/f \leq 1.11$. This condition can eliminate the aberration and distortion of the camera optical lens 10, reduce a back focal length of the camera optical lens 10, and maintain the miniaturization of the camera lens system group. Preferably, the following condition shall be satisfied, $0.56 \leq f12/f \leq 0.89$.

In the present embodiment, an F number (FNO) of the camera optical lens 10 is smaller than or equal to 2.80, thereby achieving a large aperture and good imaging performance.

In the present embodiment, the focal length of the camera optical lens 10 is defined as f. An image height of the camera optical lens 10 is defined as IH. The camera optical lens 10 further satisfies the following condition: $f/IH \geq 4.00$, thereby achieving the long-focal-length effect performance.

In the present embodiment, the distortion of the camera optical lens 10 is defined as |Distortion|, the camera optical lens 10 meets the following condition: $|Distortion| \leq 1.10\%$, so that realize small distortion.

When the above conditions are satisfied, which makes it is possible that the camera optical lens has excellent optical performances, and meanwhile can meet design requirements of large aperture, long focal length, small distortion. According the characteristics of the camera optical lens 10, it is particularly suitable for a mobile camera lens component and a WEB camera lens composed of high pixel CCD, CMOS.

The following examples will be used to describe the camera optical lens 10 of the present invention. The symbols recorded in each example will be described as follows. The focal length, on-axis distance, central curvature radius, on-axis thickness, inflexion point position, and arrest point position are all in units of mm.

TTL: the total optical length from the object side surface of the first lens L1 to the image surface Si of the camera optical lens 10 along the optical axis, the unit of TTL is mm.

F number (FNO): refers to a ratio of an effective focal length of the camera optical lens 10 to an entrance pupil diameter (ENPD).

Preferably, inflexion points and/or arrest points can also be arranged on the object side surface and/or image side surface of the lens, so that the demand for high quality imaging can be satisfied, the description below can be referred for specific implementable scheme.

The design information of the camera optical lens 10 in Embodiment 1 of the present invention is shown in the tables 1 and 2.

TABLE 1

|  | R |  | d | nd |  | vd |
|---|---|---|---|---|---|---|
| S1 | ∞ | d0= | −0.501 |  |  |  |
| R1 | 1.992 | d1= | 1.191 | nd1 | 1.5444 | v1 | 55.82 |
| R2 | −25.974 | d2= | 0.166 |  |  |  |
| R3 | 4.516 | d3= | 0.261 | nd2 | 1.6700 | v2 | 19.39 |
| R4 | 1.981 | d4= | 0.546 |  |  |  |
| R5 | −11.054 | d5= | 0.314 | nd3 | 1.5444 | v3 | 55.82 |
| R6 | −109.262 | d6= | 2.112 |  |  |  |
| R7 | −4.536 | d7= | 0.742 | nd4 | 1.6700 | v4 | 19.39 |
| R8 | −3.643 | d8= | 0.070 |  |  |  |
| R9 | −5.007 | d9= | 0.416 | nd5 | 1.5444 | v5 | 55.82 |
| R10 | −124.156 | d10= | 0.295 |  |  |  |
| R13 | ∞ | d11= | 0.248 | ndg | 1.5168 | vg | 64.17 |
| R14 | ∞ | d12= | 0.850 |  |  |  | where, the meaning of the various symbols is as follows.

S1: aperture;

R: curvature radius of an optical surface, a central curvature radius for a lens;

R1: central curvature radius of the object side surface of the first lens L1;

R2: central curvature radius of the image side surface of the first lens L1;

R3: central curvature radius of the object side surface of the second lens L2;

R4: central curvature radius of the image side surface of the second lens L2;

R5: central curvature radius of the object side surface of the third lens L3;

R6: central curvature radius of the image side surface of the third lens L3;

R7: central curvature radius of the object side surface of the fourth lens L4;

R8: central curvature radius of the image side surface of the fourth lens L4;

R9: central curvature radius of the object side surface of the fifth lens L5;

R11: central curvature radius of an object side surface of the optical filter GF;

R12: curvature radius of an image side surface of the optical filter GF;

d: on-axis thickness of a lens and an on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the optical filter GF;
d11: on-axis thickness of the optical filter GF;
d12: on-axis distance from the image side surface of the optical filter GF to the image surface;
nd: refractive index of d line (d-line is green light with a wavelength of 550 nm);
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the optical filter GF;
Table 2 shows the aspherical surface data of the camera optical lens 10 in Embodiment 1 of the present invention.

vertical distance between a point on an aspherical curve and the optic axis, and z is an aspherical depth (a vertical distance between a point on an aspherical surface, having a distance of r from the optic axis, and a surface tangent to a vertex of the aspherical surface on the optic axis).

Table 3 and Table 4 show design data of inflexion points and arrest points of respective lens in the camera optical lens 10 according to Embodiment 1 of the present invention. P1R1 and P1R2 represent the object side surface and the image side surface of the first lens L1, P2R1 and P2R2 represent the object side surface and the image side surface of the second lens L2, P3R1 and P3R2 represent the object side surface and the image side surface of the third lens L3, P4R1 and P4R2 represent the object side surface and the image side surface of the fourth lens L4, and P5R1 and P5R2 represent the object side surface and the image side surface of the fifth lens L5. The data in the column named "inflexion point position" refers to vertical distances from inflexion points arranged on each lens surface to the optical axis of the camera optical lens 10. The data in the column named "arrest point position" refers to vertical distances from arrest points arranged on each lens surface to the optical axis of the camera optical lens 10.

TABLE 2

| | Conic coefficient | Aspheric surface coefficients | | | | |
|---|---|---|---|---|---|---|
| | k | A4 | A6 | A8 | A10 | A12 |
| R1 | −3.0991E−03 | −2.2669E−04 | 4.5942E−04 | −1.5944E−03 | 2.4418E−03 | −1.9329E−03 |
| R2 | −1.1667E+02 | 1.1772E−02 | 5.2252E−02 | −1.5099E−01 | 2.4818E−01 | −2.5312E−01 |
| R3 | −4.2159E+01 | −4.3967E−03 | 7.4606E−02 | −1.6234E−01 | 3.0346E−01 | −3.8186E−01 |
| R4 | 1.6852E+00 | −1.1820E−01 | 2.2399E−01 | −7.1579E−01 | 1.9974E+00 | −3.6233E+00 |
| R5 | 1.1184E+01 | 4.0867E−02 | 5.1380E−02 | −3.2294E−03 | −4.5168E−02 | 1.1298E−01 |
| R6 | 5.5527E+03 | 6.6187E−02 | 3.5003E−02 | 3.5623E−02 | −1.7131E−01 | 3.3306E−01 |
| R7 | −3.1873E+00 | −2.8347E−02 | 5.1045E−02 | −7.6882E−02 | 5.8419E−02 | −2.6289E−02 |
| R8 | 1.2469E+00 | −9.5037E−02 | 1.2860E−01 | −1.0326E−01 | 4.9422E−02 | −1.4892E−02 |
| R9 | 1.7379E+00 | −1.9694E−01 | 1.6766E−01 | −7.7141E−02 | 1.9118E−02 | −2.0846E−03 |
| R10 | −2.3004E+06 | −1.0210E−01 | 4.3814E−02 | −2.3342E−03 | −6.0401E−03 | 2.8405E−03 |

| | Conic coefficient | Aspheric surface coefficients | | | |
|---|---|---|---|---|---|
| | k | A14 | A16 | A18 | A20 |
| R1 | −3.0991E−03 | 8.1296E−04 | −1.4332E−04 | −2.5829E−06 | 3.3488E−06 |
| R2 | −1.1667E+02 | 1.6202E−01 | −6.3070E−02 | 1.3629E−02 | −1.2553E−03 |
| R3 | −4.2159E+01 | 3.0607E−01 | −1.5006E−01 | 4.0653E−02 | −4.6482E−03 |
| R4 | 1.6852E+00 | 4.1546E+00 | −2.9126E+00 | 1.1384E+00 | −1.9184E−01 |
| R5 | 1.1184E+01 | −1.3625E−01 | 8.9226E−02 | −3.0590E−02 | 4.2323E−03 |
| R6 | 5.5527E+03 | −3.6726E−01 | 2.3206E−01 | −7.7537E−02 | 1.0456E−02 |
| R7 | −3.1873E+00 | 7.2359E−03 | −1.2010E−03 | 1.1147E−04 | −4.4846E−06 |
| R8 | 1.2469E+00 | 2.8347E−03 | −3.2607E−04 | 2.0323E−05 | −5.0662E−07 |
| R9 | 1.7379E+00 | −6.9570E−05 | 4.3418E−05 | −4.2590E−06 | 1.4152E−07 |
| R10 | −2.3004E+06 | −6.3803E−04 | 8.0621E−05 | −5.5168E−06 | 1.5992E−07 |

For convenience, an aspheric surface of each lens surface uses the aspheric surfaces shown in the below condition (1). However, the present invention is not limited to the aspherical polynomials form shown in the condition (1).

$$z = (cr^2)/\{1+[1-(k+1)(c^2r^2)]^{1/2}\} + A4r^4 + A6r^6 + A8r^8 + A10r^{10} + A12r^{12} + A14r^{14} + A16r^{16} + A18r^{18} + A20r^{20} \quad (1)$$

Where, K is a conic coefficient, A4, A6, A8, A10, A12, A14, A16, A18, A20 are aspheric surface coefficients. c is the curvature at the center of the optical surface. r is a

TABLE 3

| | Number of inflexion points | Inflexion point position 1 |
|---|---|---|
| P1R1 | 0 | / |
| P1R2 | 1 | 0.395 |
| P2R1 | 1 | 1.205 |
| P2R2 | 0 | / |
| P3R1 | 1 | 0.375 |
| P3R2 | 1 | 0.115 |
| P4R1 | 0 | / |

TABLE 3-continued

| | Number of inflexion points | Inflexion point position 1 |
|---|---|---|
| P4R2 | 0 | / |
| P5R1 | 0 | / |
| P5R2 | 0 | / |

TABLE 4

| | Number of arrest points | Arrest point position 1 |
|---|---|---|
| P1R1 | 0 | / |
| P1R2 | 1 | 0.685 |
| P2R1 | 0 | / |
| P2R2 | 0 | / |
| P3R1 | 1 | 0.595 |
| P3R2 | 1 | 0.185 |
| P4R1 | 0 | / |
| P4R2 | 0 | / |
| P5R1 | 0 | / |
| P5R2 | 0 | / |

Figure 2:
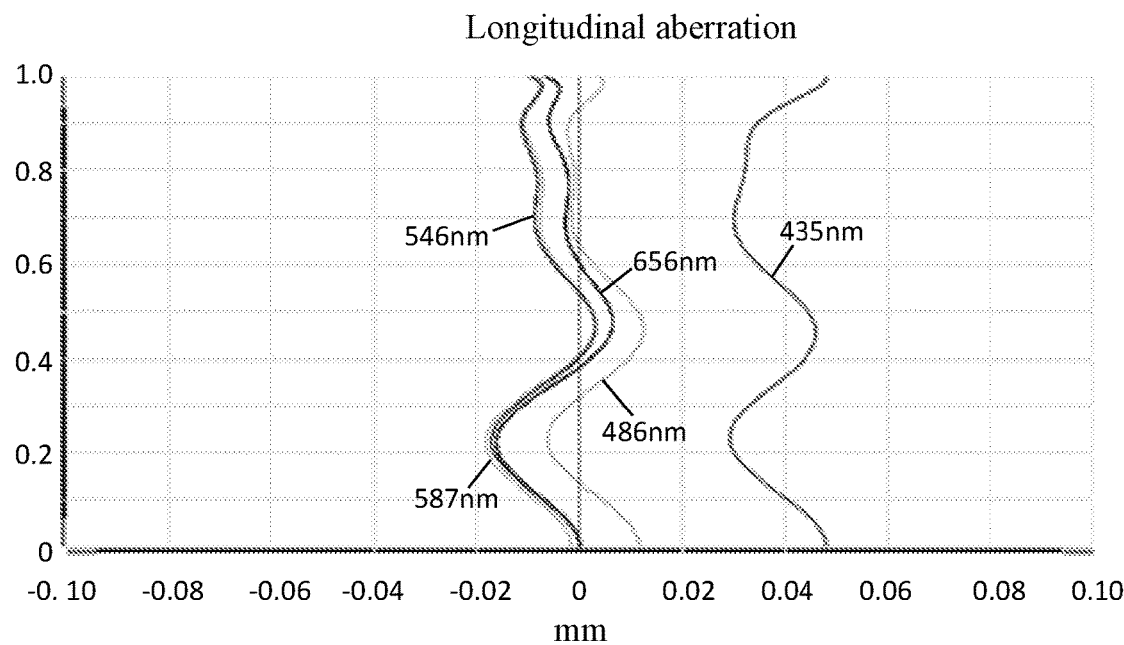
FIG. 2 is a schematic diagram of a longitudinal aberration of the camera optical lens shown in FIG. 1.
Figure 3:
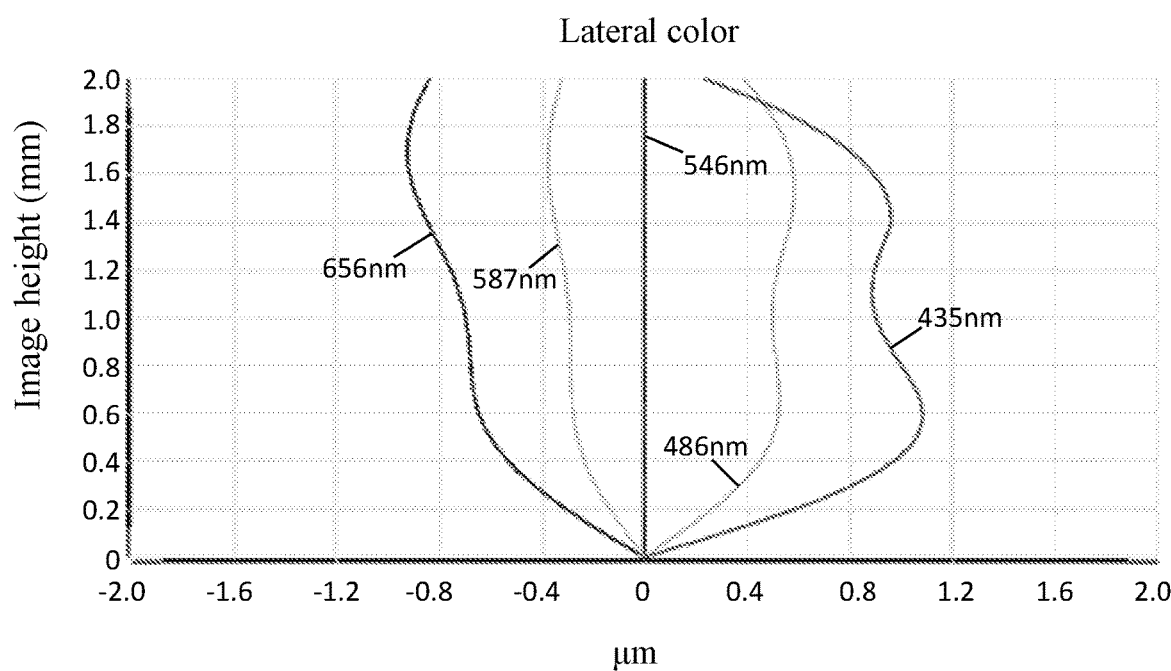
FIG. 3 is a schematic diagram of a lateral color of the camera optical lens shown in FIG. 1.
Figure 4:
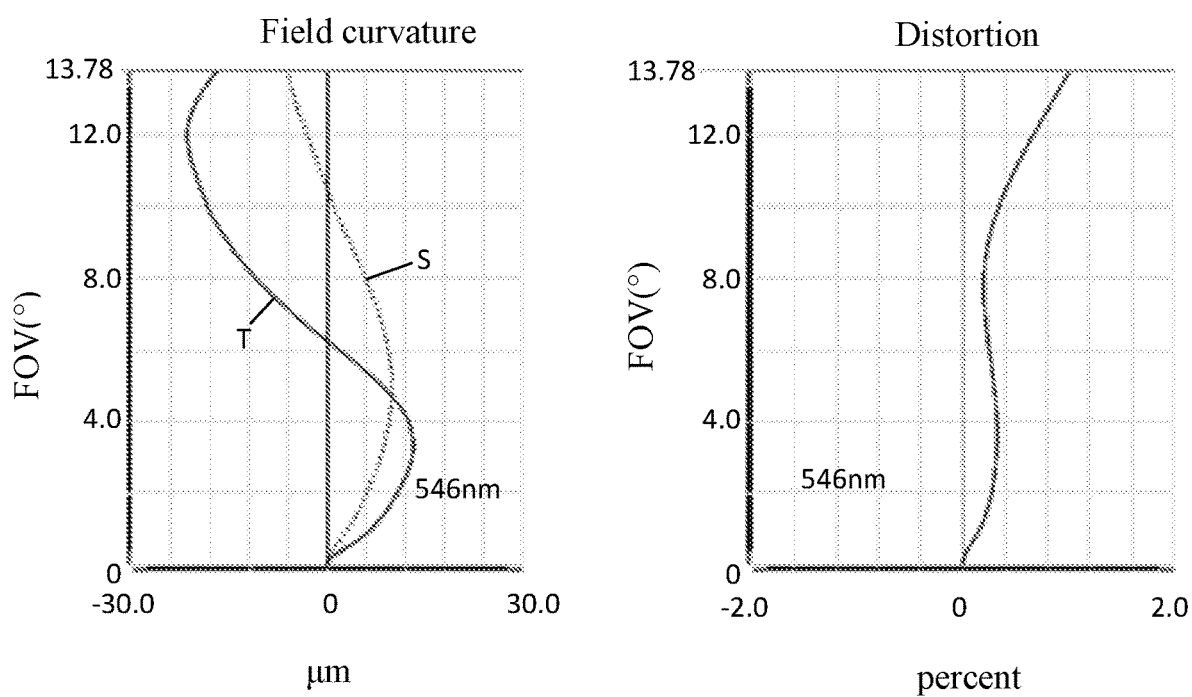
FIG. 4 is a schematic diagram of a field curvature and a distortion of the camera optical lens shown in FIG. 1.
Figure 5:
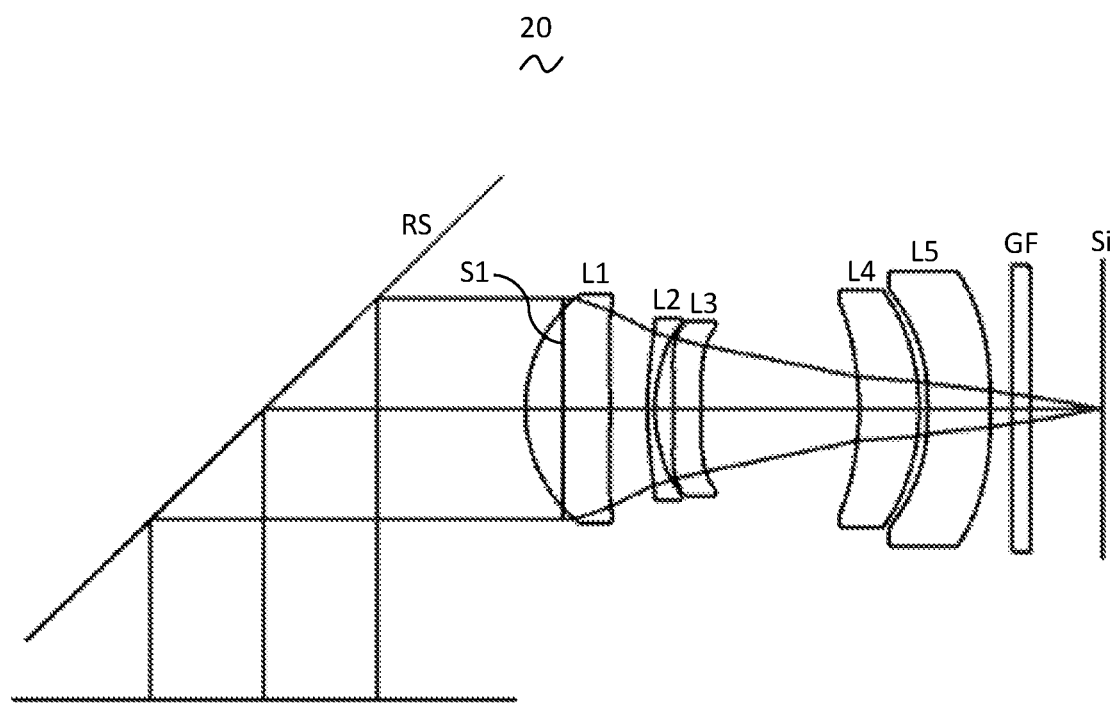
FIG. 5 is a schematic diagram of a structure of a camera optical lens in accordance with Embodiment 2 of the present invention.

FIG. 2 and FIG. 3 respectively illustrate a longitudinal aberration and a lateral color of light with wavelengths of 656 nm, 587 nm, 546 nm, 486 nm and 435 nm after passing the camera optical lens 10 according to Embodiment 1. FIG. 4 illustrates a field curvature and a distortion of light with a wavelength of 546 nm after passing the camera optical lens 10 according to Embodiment 1, in which a field curvature S is a field curvature in a sagittal direction and T is a field curvature in a tangential direction.

Table 17 shows various values of Embodiments 1, 2 and 3 and values corresponding to parameters which are specified in the above conditions.

As shown in Table 17, Embodiment 1 satisfies the above conditions.

In the present embodiment, a field of view of the camera optical lens 10 in a diagonal direction is defined as FOV. The entrance pupil diameter (ENPD) of the camera optical lens 10 is 2.883 mm. The image height of 1.0H is 2.000 mm. The FOV is 27.56°. Thus, the camera optical lens 10 satisfies design requirements of wide-angle, long-focal-length, and small distortion while the on-axis and off-axis aberrations are sufficiently corrected, thereby achieving excellent optical characteristics.

Embodiment 2

Embodiment 2 is basically the same as Embodiment 1, the meaning of its symbols is the same as that of Embodiment 1, in the following, only the differences are listed.

Table 5 and table 6 show the design data of a camera optical lens 20 in Embodiment 2 of the present invention.

TABLE 5

| | R | d | nd | vd |
|---|---|---|---|---|
| S1 | ∞ | d0= −0.501 | | |
| R1 | 2.103 | d1= 1.134 | nd1 1.5444 | v1 55.82 |
| R2 | −13.550 | d2= 0.500 | | |
| R3 | 5.108 | d3= 0.099 | nd2 1.6700 | v2 19.39 |
| R4 | 2.048 | d4= 0.252 | | |
| R5 | −8.923 | d5= 0.367 | nd3 1.5444 | v3 55.82 |
| R6 | −242.748 | d6= 2.112 | | |
| R7 | −4.183 | d7= 0.799 | nd4 1.6700 | v4 19.39 |
| R8 | −3.930 | d8= 0.121 | | |
| R9 | −7.912 | d9= 0.834 | nd5 1.5444 | v5 55.82 |
| R10 | −20.940 | d10= 0.295 | | |
| R13 | ∞ | d11= 0.248 | ndg 1.5168 | vg 64.17 |
| R14 | ∞ | d12= 0.966 | | |

Table 6 shows aspherical surface data of each lens of the camera optical lens 20 in Embodiment 2 of the present invention.

TABLE 6

| | Conic coefficient | Aspheric surface coefficients | | | | |
|---|---|---|---|---|---|---|
| | k | A4 | A6 | A8 | A10 | A12 |
| R1 | 5.4192E−03 | −9.6598E−04 | 7.6006E−04 | −1.4451E−03 | 2.4674E−03 | −1.9225E−03 |
| R2 | −1.5176E+02 | 1.1006E−02 | 5.1018E−02 | −1.5071E−01 | 2.4837E−01 | −2.5302E−01 |
| R3 | −5.3669E+01 | −9.5593E−03 | 6.9150E−02 | −1.6602E−01 | 3.0215E−01 | −3.8177E−01 |
| R4 | 1.7309E+00 | −1.3908E−01 | 2.1630E−01 | −7.1461E−01 | 1.9982E+00 | −3.6231E+00 |
| R5 | 1.1663E+00 | 4.6232E−02 | 5.4561E−02 | −1.3466E−01 | −4.3671E−02 | 1.1415E−01 |
| R6 | −9.3254E+06 | 8.7718E−02 | 4.2460E−02 | 3.4104E−02 | −1.7927E−01 | 3.311OE−O1 |
| R7 | −2.6924E+01 | −3.7424E−02 | 5.3063E−02 | −7.5832E−02 | 5.8206E−02 | −2.6297E−02 |
| R8 | 1.5303E+00 | −9.2496E−02 | 1.2981E−01 | −1.0324E−01 | 4.9422E−02 | −1.4892E−02 |
| R9 | 4.1896E+00 | −2.0186E−01 | 1.6656E−01 | −7.7202E−02 | 1.9120E−02 | −2.0839E−03 |
| R10 | −4.3853E+03 | −1.0372E−01 | 4.2947E−02 | −2.2939E−03 | −6.0352E−03 | 2.8412E−03 |

| | Conic coefficient | Aspheric surface coefficients | | | |
|---|---|---|---|---|---|
| | k | A14 | A16 | A18 | A20 |
| R1 | 5.4192E−03 | 8.1683E−04 | −1.4273E−04 | −2.1759E−06 | 3.8162E−06 |
| R2 | −1.5176E+02 | 1.6204E−01 | −6.3077E−02 | 1.3624E−01 | −1.2503E−03 |
| R3 | −5.3669E+01 | 3.0662E−01 | −1.4967E−01 | 4.0753E−02 | −4.8988E−03 |
| R4 | 1.7309E+00 | 4.1546E+00 | −2.9125E+00 | 1.1383E+00 | −1.9150E−01 |
| R5 | 1.1663E+00 | −1.3565E−01 | 8.8860E−02 | −3.0360E−02 | 3.7527E−03 |
| R6 | −9.3254E+06 | −3.6459E−01 | 2.3232E−01 | −7.7398E−02 | 1.0377E−02 |
| R7 | −2.6924E+01 | 7.2422E−03 | −1.2011E−03 | 1.1099E−04 | −4.4951E−06 |
| R8 | 1.5303E+00 | 2.8343E−03 | −3.2613E−04 | 2.0318E−05 | −5.1266E−07 |
| R9 | 4.1896E+00 | −6.9505E−05 | 4.3421E−05 | −4.2601E−06 | 1.4162E−07 |
| R10 | −4.3853E+03 | −6.3801E−04 | 8.0610E−05 | −5.5187E−06 | 1.5978E−07 |

Table 7 and table 8 show design data of inflexion points and arrest points of respective lens in the camera optical lens 20 according to Embodiment 2 of the present invention.

TABLE 7

|  | Number of inflexion points | Inflexion point position 1 |
|---|---|---|
| P1R1 | 0 | / |
| P1R2 | 1 | 0.495 |
| P2R1 | 1 | 0.995 |
| P2R2 | 1 | 1.155 |
| P3R1 | 1 | 0.385 |
| P3R2 | 1 | 0.055 |
| P4R1 | 0 | / |
| P4R2 | 0 | / |
| P5R1 | 0 | / |
| P5R2 | 0 | / |

TABLE 8

|  | Number of arrest points | Arrest point position1 |
|---|---|---|
| P1R1 | 0 | / |
| P1R2 | 1 | 0.895 |
| P2R1 | 1 | 1.235 |
| P2R2 | 0 | / |
| P3R1 | 1 | 0.615 |
| P3R2 | 1 | 0.085 |
| P4R1 | 0 | / |
| P4R2 | 0 | / |
| P5R1 | 0 | / |
| P5R2 | 0 | / |

Figure 6:
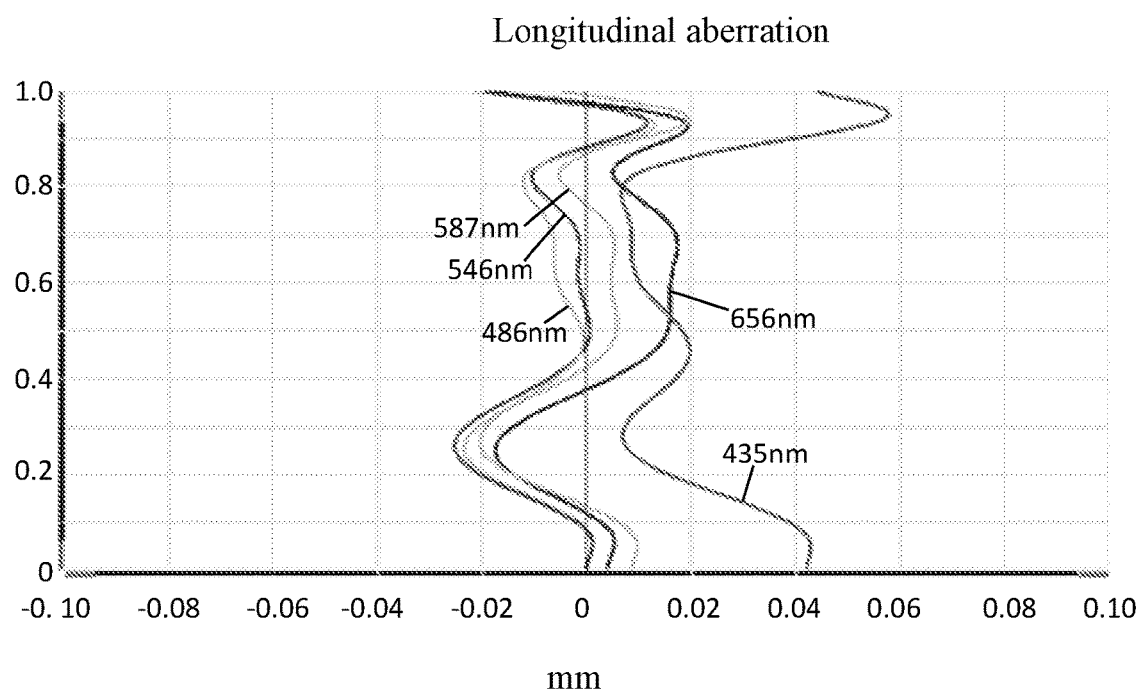
FIG. 6 is a schematic diagram of a longitudinal aberration of the camera optical lens shown in FIG. 5.
Figure 7:
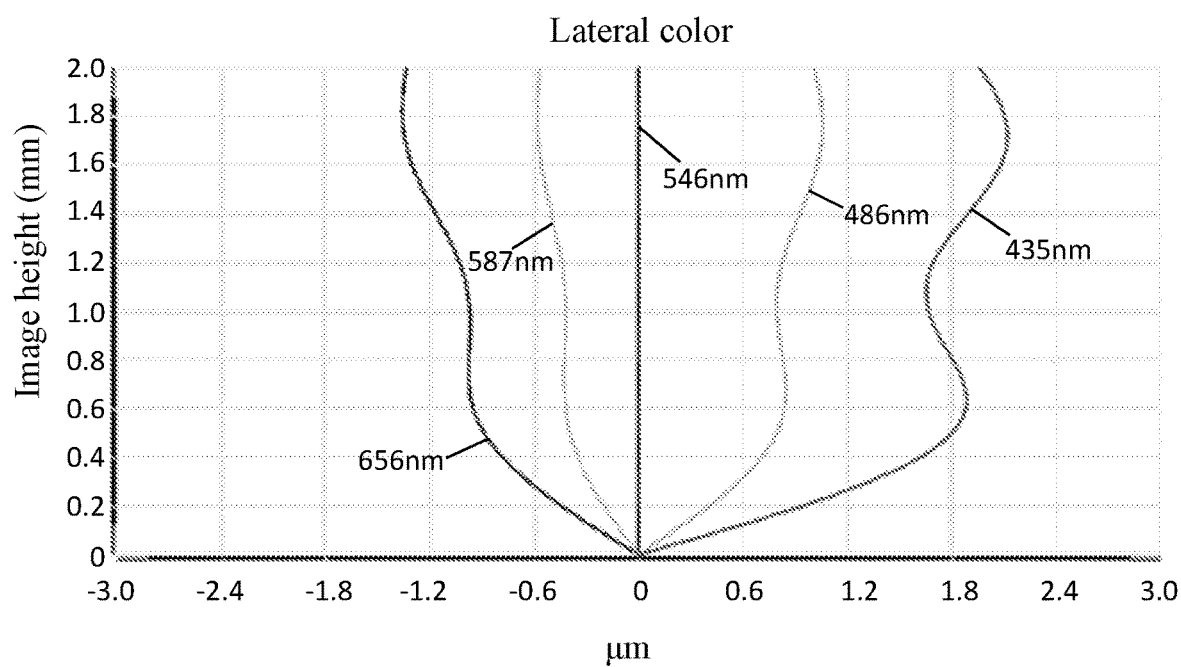
FIG. 7 is a schematic diagram of a lateral color of the camera optical lens shown in FIG. 5.
Figure 8:
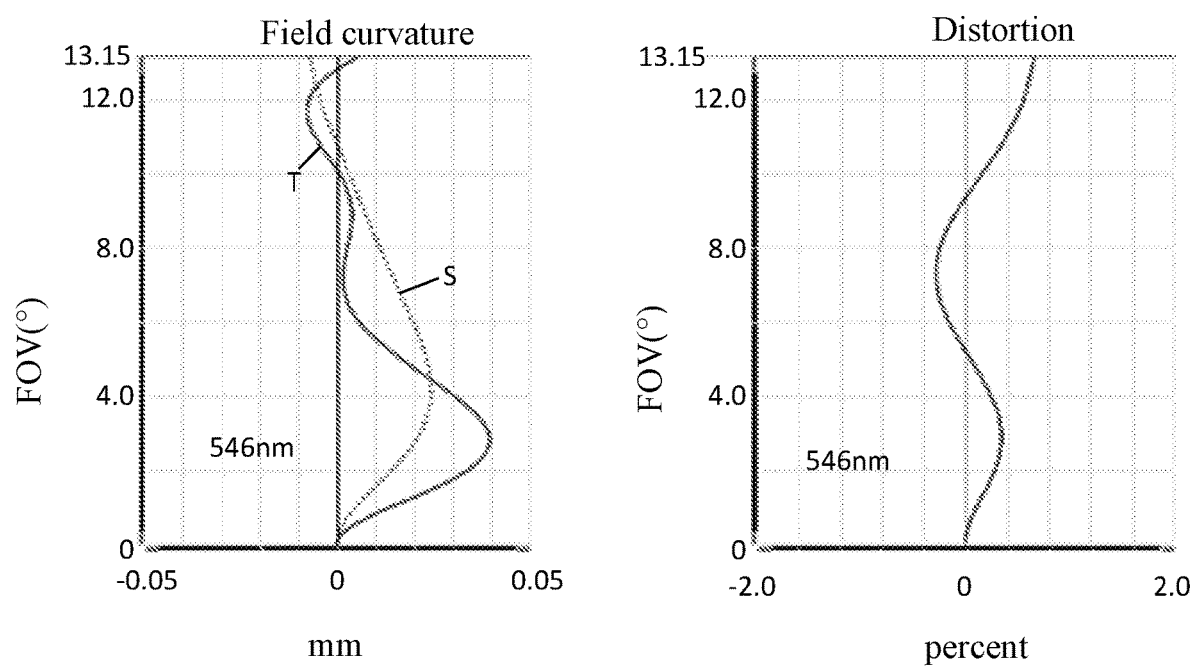
FIG. 8 is a schematic diagram of a field curvature and a distortion of the camera optical lens shown in FIG. 5.

FIG. 6 and FIG. 7 respectively illustrate a longitudinal aberration and a lateral color of light with wavelengths of 656 nm, 587 nm, 546 nm, 486 nm and 435 nm after passing the camera optical lens 20 according to Embodiment 2. FIG. 8 illustrates a field curvature and a distortion of light with a wavelength of 546 nm after passing the camera optical lens 10 according to Embodiment 2, in which a field curvature S is a field curvature in a sagittal direction and T is a field curvature in a tangential direction.

As shown in Table 13, Embodiment 2 satisfies the above conditions.

In the present embodiment, an entrance pupil diameter (ENPD) of the camera optical lens 20 is 3.037 mm. An image height of 1.0H is 2.000 mm. An FOV is 26.30°. Thus, the camera optical lens 20 satisfies design requirements of wide-angle, long-focal-length, small distortion while on-axis and off-axis aberrations are sufficiently corrected, thereby achieving excellent optical characteristics.

Embodiment 3

Embodiment 3 is basically the same as Embodiment 1 and involves symbols having the same meanings as Embodiment 1, and only differences therebetween will be described in the following.

Figure 9:
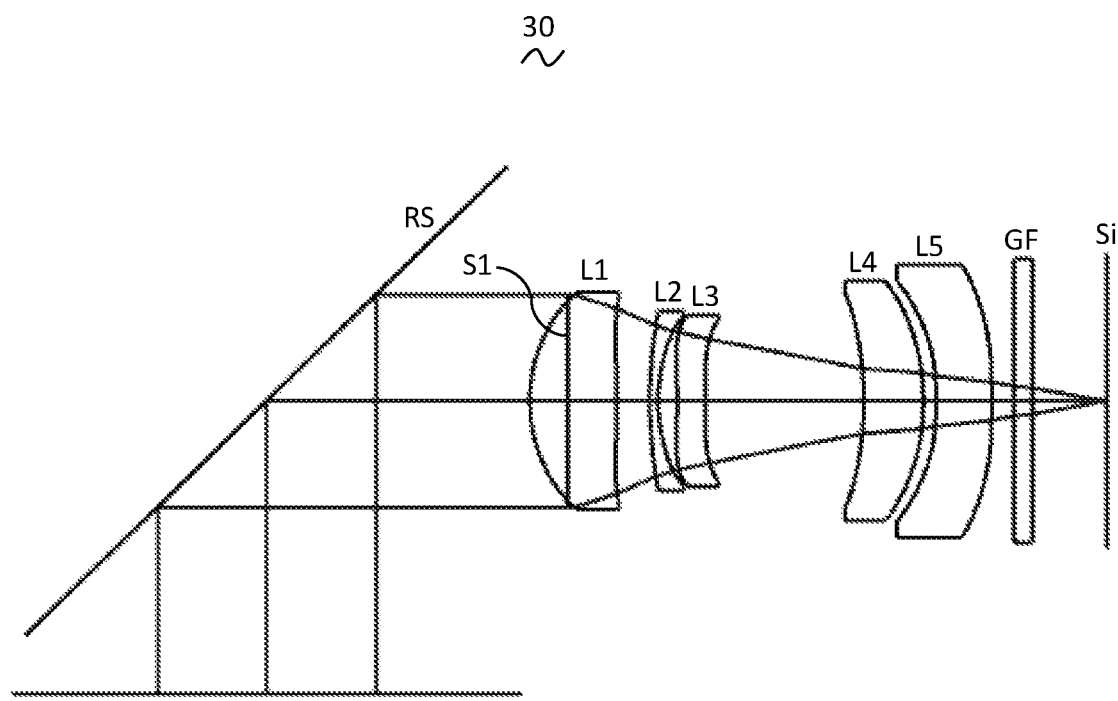
FIG. 9 is a schematic diagram of a structure of a camera optical lens in accordance with Embodiment 3 of the present invention.

FIG. 9 shows a schematic diagram of a structure of a camera optical lens 30 according to Embodiment 3 of the present invention.

Tables 9 and 10 show design data of a camera optical lens 30 in Embodiment 3 of the present invention.

TABLE 9

|  | R | d |  | nd |  | vd |
|---|---|---|---|---|---|---|
| S1 | ∞ | d0= | −0.501 |  |  |  |
| R1 | 2.129 | d1= | 1.157 | nd1 | 1.5444 v1 | 55.82 |
| R2 | −12.940 | d2= | 0.441 |  |  |  |
| R3 | 5.175 | d3= | 0.108 | nd2 | 1.6700 v2 | 19.39 |
| R4 | 2.068 | d4= | 0.257 |  |  |  |
| R5 | −9.704 | d5= | 0.375 | nd3 | 1.5444 v3 | 55.82 |
| R6 | −173.971 | d6= | 2.112 |  |  |  |
| R7 | −4.817 | d7= | 0.792 | nd4 | 1.6700 v4 | 19.39 |
| R8 | −3.840 | d8= | 0.170 |  |  |  |
| R9 | −7.921 | d9= | 0.741 | nd5 | 1.5444 v5 | 55.82 |
| R10 | −31.085 | d10= | 0.295 |  |  |  |
| R13 | ∞ | d11= | 0.248 | ndg | 1.5168 vg | 64.17 |
| R14 | ∞ | d12= | 0.995 |  |  |  |

Table 10 shows aspherical surface data of each lens of the camera optical lens 30 in Embodiment 3 of the present invention.

TABLE 10

|  | Conic coefficient | Aspheric surface coefficients | | | | |
|---|---|---|---|---|---|---|
|  | K | A4 | A6 | A8 | A10 | A12 |
| R1 | 1.6233E−02 | −7.6063E−04 | 7.8281E−04 | −1.4124E−03 | 2.4740E−03 | −1.9226E−03 |
| R2 | −2.3349E+02 | 9.9852E−03 | 5.1268E−02 | −1.5042E−01 | 2.4839E−01 | −2.5303E−01 |
| R3 | −5.2870E+01 | −1.1069E−02 | 6.7461E−02 | −1.6582E−01 | 3.0293E−01 | −3.8009E−01 |
| R4 | 1.7853E+00 | −1.4066E−01 | 2.1724E−01 | −7.1418E−01 | 1.9976E+00 | −3.6236E+00 |
| R5 | 2.0582E+00 | 4.6968E−02 | 5.7265E−02 | −1.1019E−03 | −4.6285E−02 | 1.1379E−01 |
| R6 | −1.2278E+06 | 8.3611E−02 | 4.1984E−02 | 3.7207E−02 | −1.8465E−01 | 3.3169E−01 |
| R7 | −2.2599E+01 | −3.2102E−02 | 5.2069E−02 | −7.5866E−02 | 5.8227E−02 | −2.6283E−02 |
| R8 | 1.4847E+00 | −9.3344E−02 | 1.2963E−01 | −1.0319E−01 | 4.9432E−02 | −1.4891E−02 |
| R9 | 3.9393E+00 | −2.0183E−01 | 1.6659E−01 | −7.7200E−02 | 1.9119E−02 | −2.0839E−03 |
| R10 | −8.6682E+03 | −1.0147E−01 | 4.2578E−02 | −2.2826E−03 | −6.0325E−03 | 2.8413E−03 |

|  | Conic coefficient | Aspheric surface coefficients | | | |
|---|---|---|---|---|---|
|  | k | A14 | A16 | A18 | A20 |
| R1 | 1.6233E−02 | 8.1474E−04 | −1.4452E−04 | −2.6396E−06 | 4.3056E−06 |
| R2 | −2.3349E+02 | 1.6202E−01 | −6.3079E−02 | 1.3627E−02 | −1.2478E−03 |
| R3 | −5.2870E+01 | 3.0688E−01 | −1.5010E−01 | 4.0651E−02 | −4.8249E−03 |
| R4 | 1.7853E+00 | 4.1544E+00 | −2.9123E+00 | 1.1394E+00 | −1.9177E−01 |
| R5 | 2.0582E+00 | −1.3654E−01 | 8.7986E−02 | −2.9464E−02 | 4.0037E−03 |

TABLE 10-continued

| | | | | |
|---|---|---|---|---|
| R6 | −1.2278E+06 | −3.6066E−01 | 2.3475E−01 | −8.4620E−02 | 1.3270E−02 |
| R7 | −2.2599E+01 | 7.2420E−03 | −1.2018E−03 | 1.1089E−04 | −4.4398E−06 |
| R8 | 1.4847E+00 | 2.8342E−03 | −3.2617E−04 | 2.0311E−05 | −5.1058E−07 |
| R9 | 3.9393E+00 | −6.9514E−05 | 4.3421E−05 | −4.2608E−06 | 1.4172E−07 |
| R10 | −8.6682E+03 | −6.3804E−04 | 8.0605E−05 | −5.5186E−06 | 1.5989E−07 |

Table 11 and table 12 show Embodiment 3 design data of inflexion points and arrest points of respective lens in the camera optical lens 30 according to Embodiment 3 of the present invention.

TABLE 11

| | Number of inflexion points | Inflexion point position 1 |
|---|---|---|
| P1R1 | 0 | / |
| P1R2 | 1 | 0.485 |
| P2R1 | 1 | 1.155 |
| P2R2 | 0 | / |
| P3R1 | 1 | 0.365 |
| P3R2 | 1 | 0.075 |
| P4R1 | 0 | / |
| P4R2 | 0 | / |
| P5R1 | 0 | / |
| P5R2 | 0 | / |

TABLE 12

| | Number of arrest points | Arrest point position1 |
|---|---|---|
| P1R1 | 0 | / |
| P1R2 | 1 | 0.875 |
| P2R1 | 0 | / |
| P2R2 | 0 | / |
| P3R1 | 1 | 0.585 |
| P3R2 | 1 | 0.115 |
| P4R1 | 0 | / |
| P4R2 | 0 | / |
| P5R1 | 0 | / |
| P5R2 | 0 | / |

Figure 10:
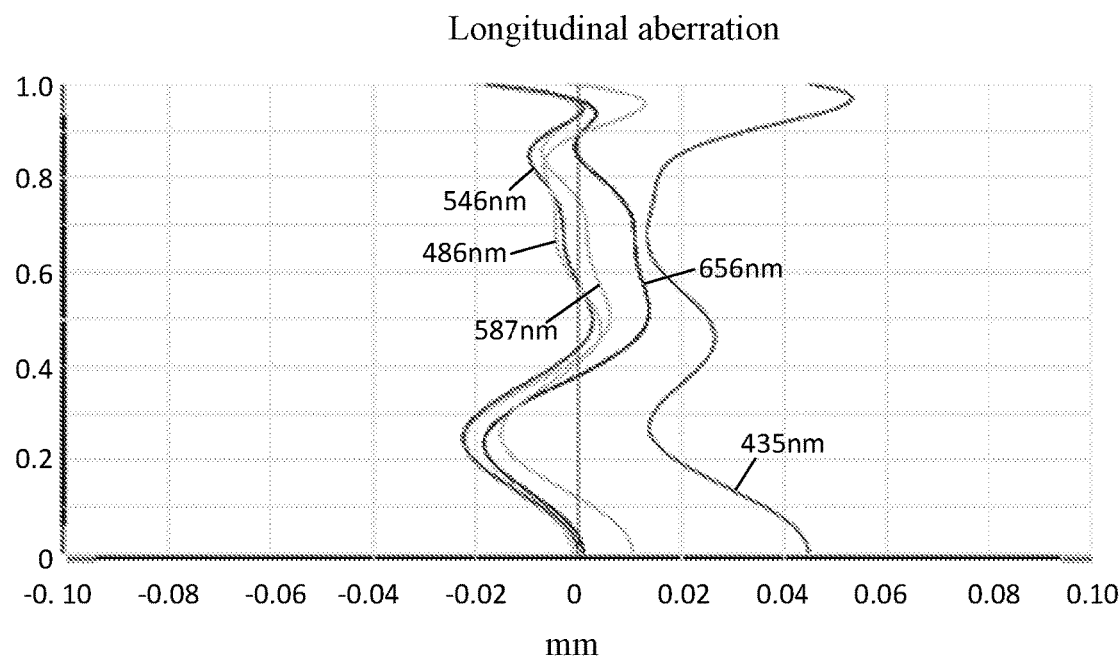
FIG. 10 is a schematic diagram of a longitudinal aberration of the camera optical lens shown in FIG. 9.
Figure 11:
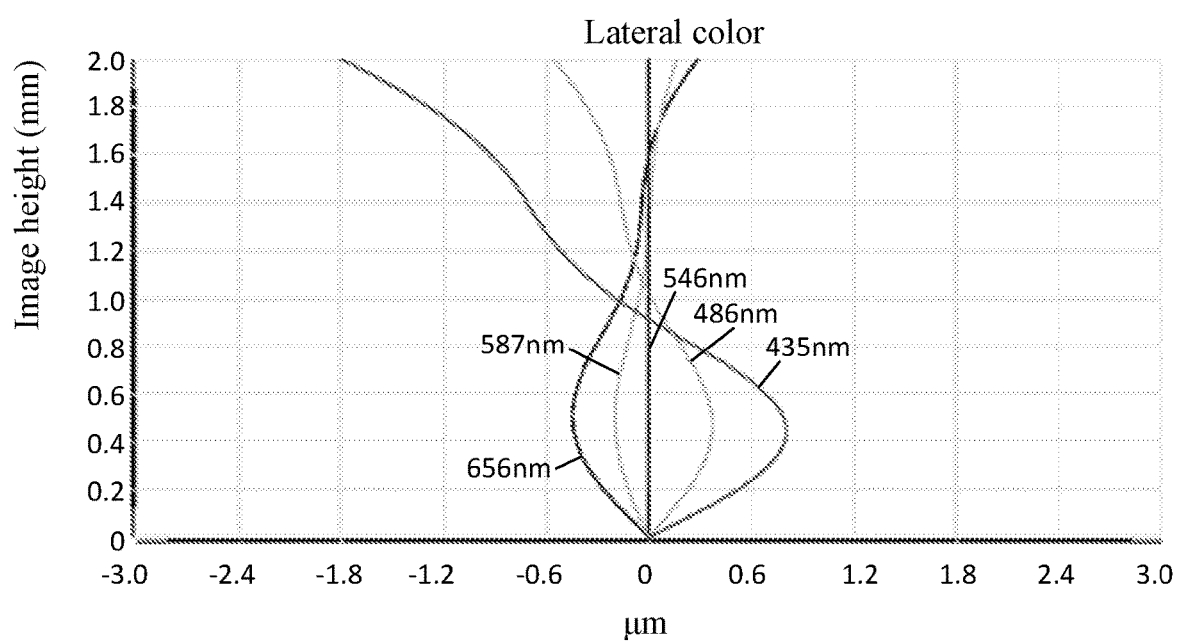
FIG. 11 is a schematic diagram of a lateral color of the camera optical lens shown in FIG. 9.
Figure 12:
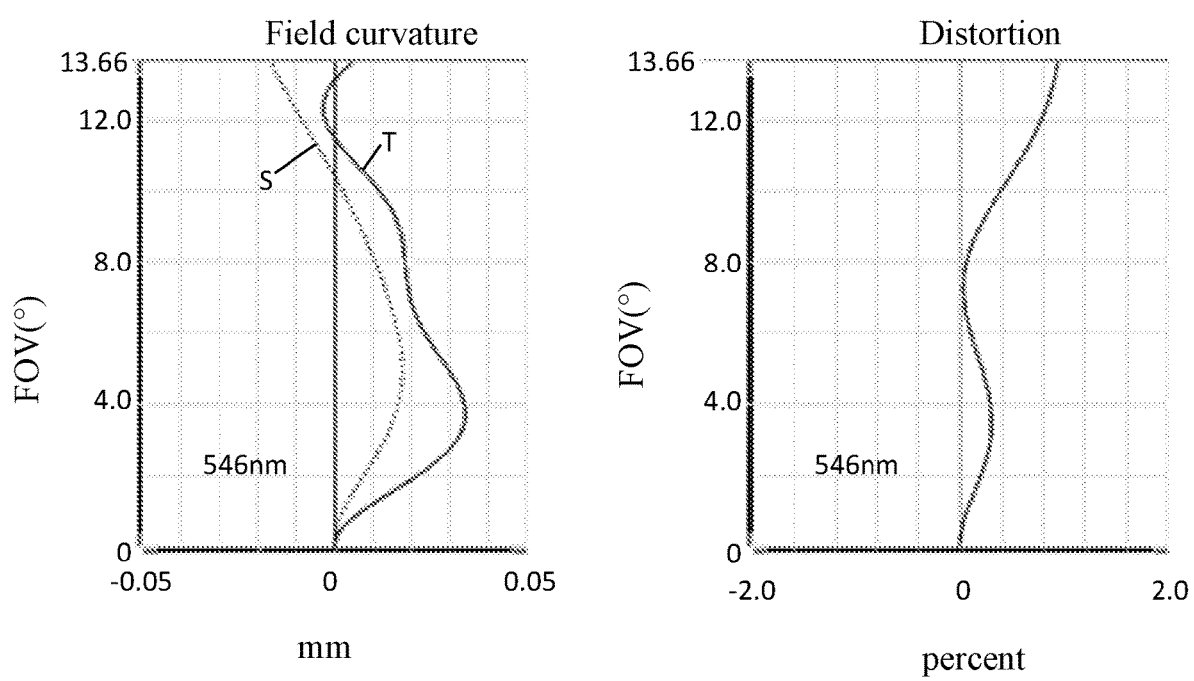
FIG. 12 is a schematic diagram of a field curvature and a distortion of the camera optical lens shown in FIG. 9.

FIG. 10 and FIG. 11 respectively illustrate a longitudinal aberration and a lateral color of light with wavelengths of 656 nm, 587 nm, 546 nm, 486 nm and 435 nm after passing the camera optical lens 30 according to Embodiment 3. FIG. 12 illustrates a field curvature and a distortion of light with a wavelength of 546 nm after passing the camera optical lens 30 according to Embodiment 3, in which a field curvature S is a field curvature in a sagittal direction and T is a field curvature in a tangential direction.

Table 17 in the following lists values corresponding to the respective conditions. In the present Embodiment 3 in order to satisfy the above conditions.

In the present embodiment, an entrance pupil diameter (ENPD) of the camera optical lens 30 is 2.912 mm. An image height of 1.0H is 2.000 mm. An FOV is 27.31°. Thus, the camera optical lens 30 satisfies design requirements of wide-angle, long-focal-length, and small distortion, while on-axis and off-axis aberrations are sufficiently corrected, thereby achieving excellent optical characteristics.

Comparative Embodiment

Figure 13:
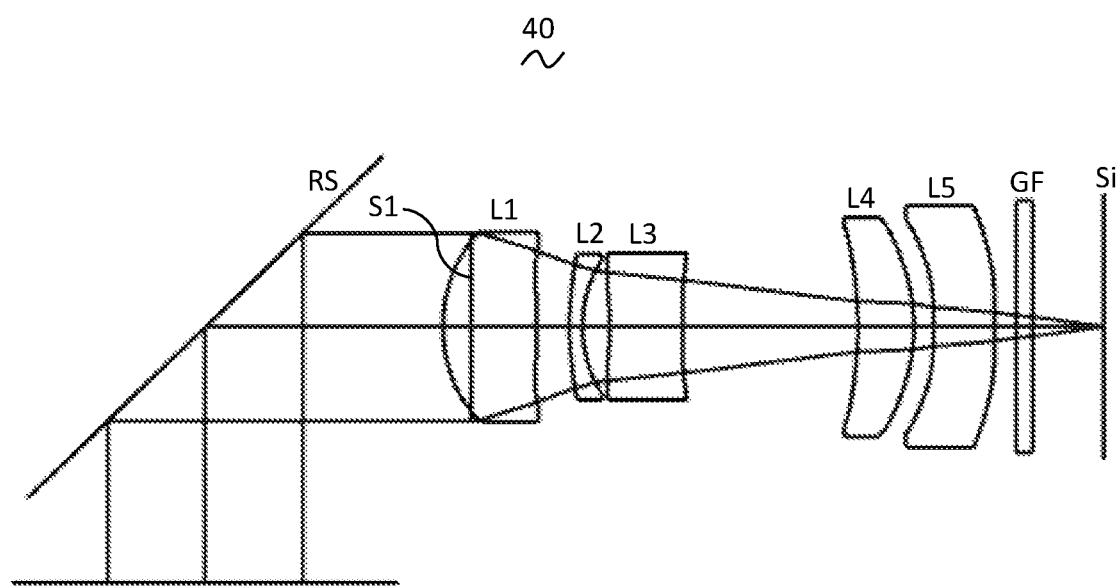
FIG. 13 is a schematic diagram of a structure of a camera optical lens in accordance with a Comparative Embodiment.

FIG. 13 shows a camera optical lens 40 according to comparative embodiment. Comparative embodiment is basically the same as Embodiment 1 and involves symbols having the same meanings as Embodiment 1, and only differences therebetween will be described in the following.

In the comparative embodiment, a fifth lens L5 has a positive refractive power.

Table 13 and Table 14 show the design data of a camera optical lens 40 in the comparative embodiment.

TABLE 13

| | R | d | | nd | | vd |
|---|---|---|---|---|---|---|
| S1 | ∞ | d0= | −0.429 | | | |
| R1 | 2.434 | d1= | 1.401 | nd1 | 1.5444 | v1 | 55.82 |
| R2 | −14.821 | d2= | 0.497 | | | |
| R3 | 3.713 | d3= | 0.201 | nd2 | 1.6700 | v2 | 19.39 |
| R4 | 2.067 | d4= | 0.407 | | | |
| R5 | −3.708 | d5= | 1.094 | nd3 | 1.5444 | v3 | 55.82 |
| R6 | −46.582 | d6= | 2.634 | | | |
| R7 | −5.330 | d7= | 0.841 | nd4 | 1.6700 | v4 | 19.39 |
| R8 | −3.398 | d8= | 0.297 | | | |
| R9 | −29.479 | d9= | 0.919 | nd5 | 1.5444 | v5 | 55.82 |
| R10 | −3.360 | d10= | 0.326 | | | |
| R13 | ∞ | d11= | 0.248 | ndg | 1.5168 | vg | 64.17 |
| R14 | ∞ | d12= | 1.068 | | | |

Table 14 shows aspherical surface data of each lens of the camera optical lens 40 in the comparative embodiment.

TABLE 14

| | Conic coefficient | Aspheric surface coefficients | | | | |
|---|---|---|---|---|---|---|
| | k | A4 | A6 | A8 | A10 | A12 |
| R1 | 1.3799E−01 | 3.2649E−03 | 9.5665E−04 | −1.0773E−03 | 2.6333E−03 | −1.8956E−03 |
| R2 | 6.1828E+01 | 3.5864E−03 | 6.0531E−02 | −1.4641E−01 | 2.4832E−01 | −2.5344E−01 |
| R3 | −5.0711E+01 | −1.7250E−02 | 6.2284E−02 | −1.5919E−01 | 3.0841E−01 | −3.8103E−01 |
| R4 | 2.0381E+00 | −1.0747E−01 | 2.4720E−01 | −7.2239E−01 | 1.9750E+00 | −3.6356E+00 |
| R5 | −2.7084E+01 | 6.5529E−02 | 4.7227E−02 | −2.3864E−02 | −5.6491E−02 | 1.1513E−01 |
| R6 | 6.7585E−02 | −2.5274E−02 | 4.1597E−02 | −1.7301E−01 | 3.3267E−01 | −3.6356E−01 |
| R7 | −2.7574E+01 | −1.8973E−02 | 5.5829E−02 | −7.6501E−02 | 5.7936E−02 | −2.6388E−02 |
| R8 | 3.2508E−02 | −8.3995E−02 | 1.3139E−01 | −1.0288E−01 | 4.9326E−02 | −1.4963E−02 |
| R9 | 2.0733E+02 | −2.0462E−01 | 1.6757E−01 | −7.7350E−02 | 1.9178E−02 | −2.0559E−03 |
| R10 | −9.7840E−02 | 4.2247E−02 | −2.0392E−03 | −6.0313E−03 | 2.8409E−03 | −6.3636E−04 |

TABLE 14-continued

| | Conic coefficient | Aspheric surface coefficients | | | |
|---|---|---|---|---|---|
| | k | A14 | A16 | A18 | A20 |
| R1 | 1.3799E−01 | 8.1037E−04 | −1.4757E−04 | −2.6020E−06 | 4.4974E−06 |
| R2 | 6.1828E+01 | 1.6199E−01 | −6.2991E−02 | 1.3684E−02 | −1.1759E−03 |
| R3 | −5.0711E+01 | 3.0425E−01 | −1.5113E−01 | 4.1180E−02 | −4.3304E−03 |
| R4 | 2.0381E+00 | 4.1534E+00 | −2.9097E+00 | 1.1401E+00 | −1.9455E−01 |
| R5 | −2.7084E+01 | −1.3315E−01 | 8.8320E−02 | −3.2405E−02 | 9.5239E−04 |
| R6 | 6.7585E−02 | 2.3348E−01 | −8.4107E−02 | 1.3602E−02 | 0.0000E+00 |
| R7 | −2.7574E+01 | 7.2079E−03 | −1.2044E−03 | 1.1625E−04 | −3.3431E−06 |
| R8 | 3.2508E−02 | 2.8123E−03 | −3.2933E−04 | 2.0848E−05 | 1.0757E−07 |
| R9 | 2.0733E+02 | −6.5136E−05 | 4.2154E−05 | −5.0489E−06 | −2.1176E−07 |
| R10 | −9.7840E−02 | 8.1184E−05 | −5.4796E−06 | 8.9703E−08 | 0.0000E+00 |

Table 15 and table 16 show the comparative embodiment design data of inflexion points and arrest points of respective lens in the camera optical lens 30 according to comparative embodiment of the present invention.

TABLE 15

| | Number of inflexion points | Inflexion point position 1 | Inflexion point position 2 |
|---|---|---|---|
| P1R1 | 0 | / | / |
| P1R2 | 1 | 0.565 | / |
| P2R1 | 0 | / | / |
| P2R2 | 1 | 0.965 | / |
| P3R1 | 2 | 0.425 | 0.925 |
| P3R2 | 2 | 1.025 | 1.065 |
| P4R1 | 1 | 1.605 | / |
| P4R2 | 0 | / | / |
| P5R1 | 0 | / | / |
| P5R2 | 0 | / | / |

TABLE 16

| | Number of arrest points | Arrest point position1 | Arrest point position 2 |
|---|---|---|---|
| P1R1 | 0 | / | / |
| P1R2 | 1 | 0.865 | / |
| P2R1 | 0 | / | / |
| P2R2 | 0 | / | / |
| P3R1 | 2 | 0.755 | 0.995 |
| P3R2 | 0 | / | / |
| P4R1 | 0 | / | / |
| P4R2 | 0 | / | / |
| P5R1 | 0 | / | / |
| P5R2 | 0 | / | / |

Figure 14:
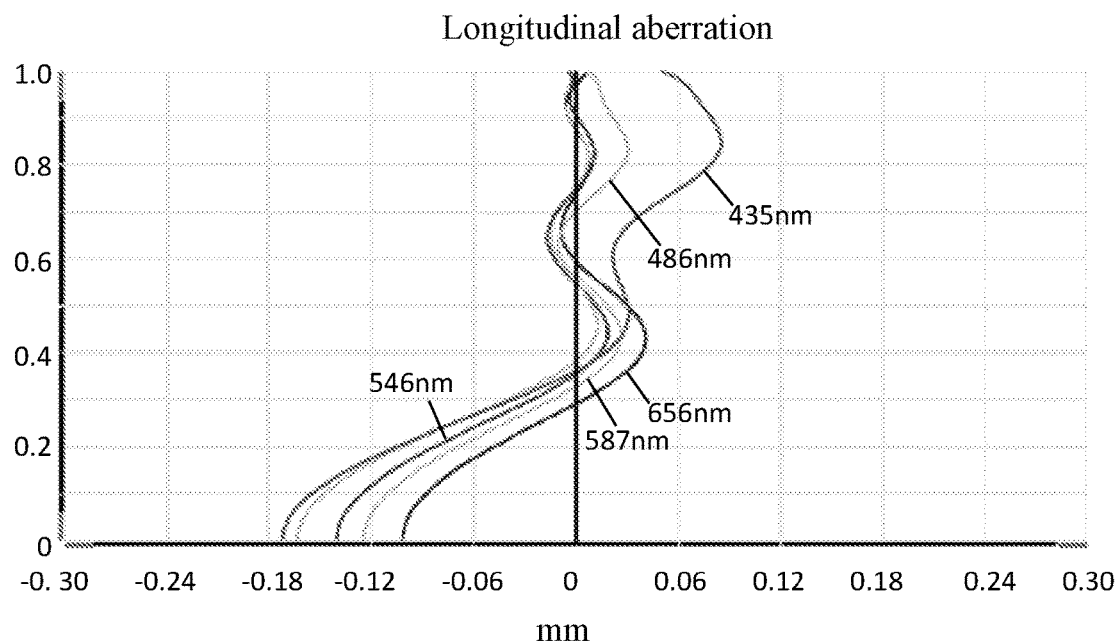
FIG. 14 is a schematic diagram of a longitudinal aberration of the camera optical lens shown in FIG. 13.
Figure 15:
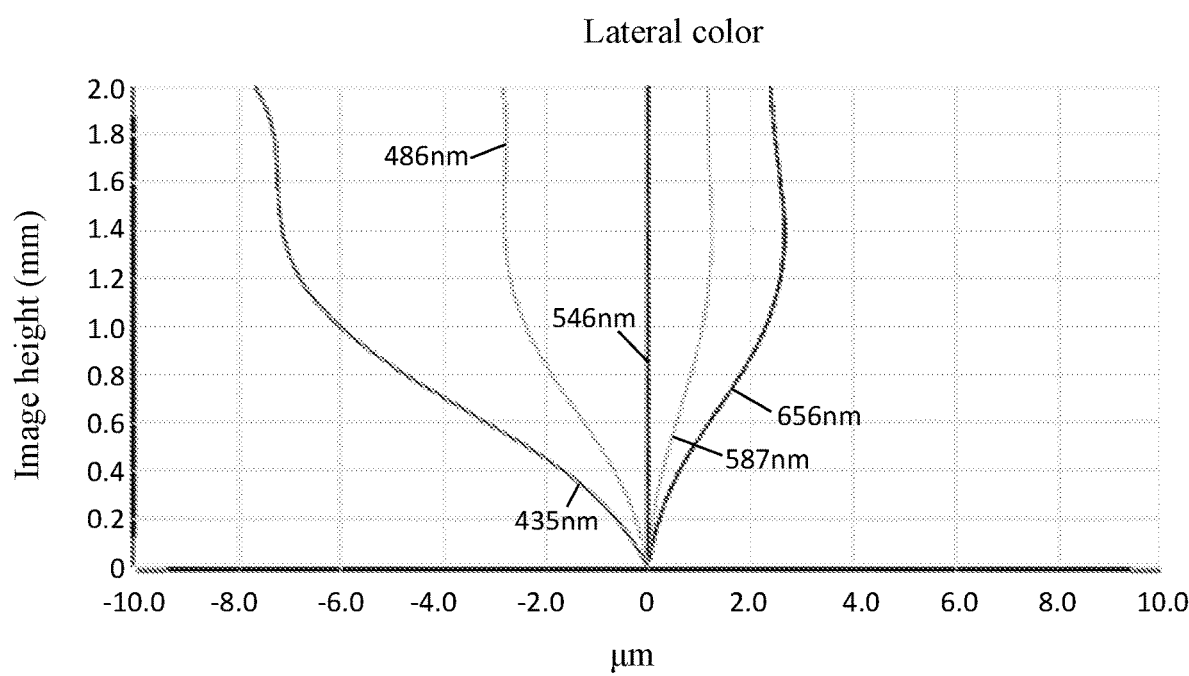
FIG. 15 is a schematic diagram of a lateral color of the camera optical lens shown in FIG. 13.
Figure 16:
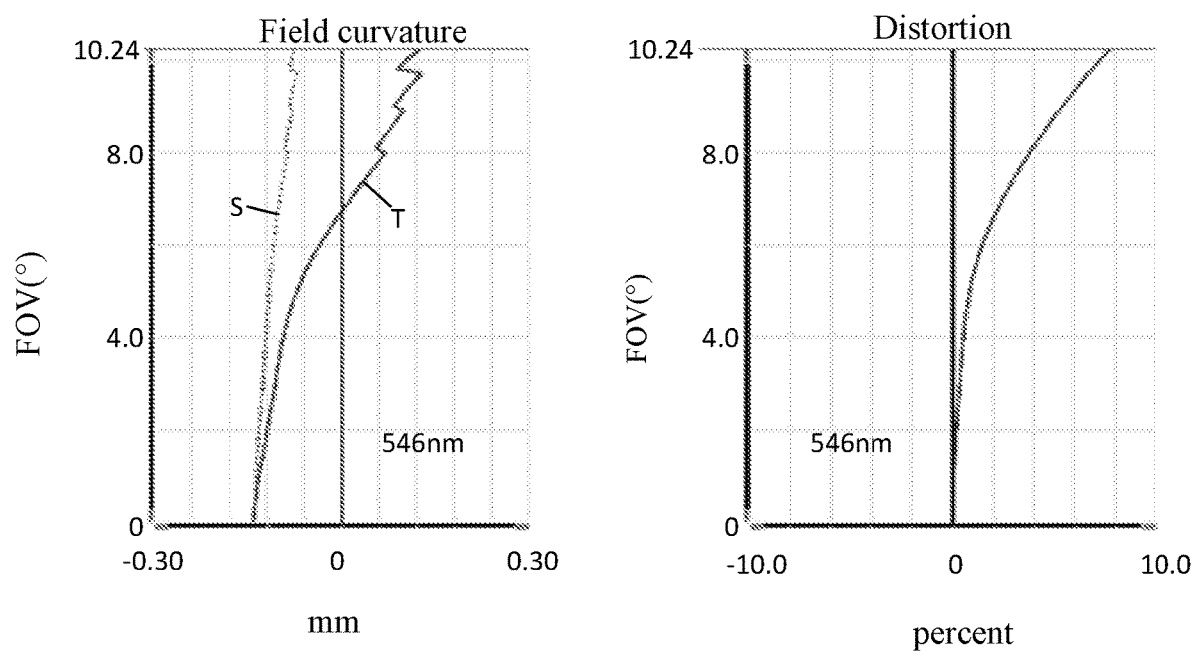
FIG. 16 is a schematic diagram of a field curvature and a distortion of the camera optical lens shown in FIG. 13.

FIG. 14 and FIG. 15 respectively illustrate a longitudinal aberration and a lateral color of light with wavelengths of 656 nm, 587 nm, 546 nm, 486 nm and 435 nm after passing the camera optical lens 30 according to Comparative Embodiment. FIG. 16 illustrates a field curvature and a distortion of light with a wavelength of 546 nm after passing the camera optical lens 40 according to Comparative Embodiment, in which a field curvature S is a field curvature in a sagittal direction and T is a field curvature in a tangential direction.

Table 17 in the following lists values corresponding to the respective conditions. In the present Comparative Embodiment cannot satisfy the above condition: $0.90 \leq f/TTL$.

In the present embodiment, an entrance pupil diameter (ENPD) of the camera optical lens 40 is 2.929 mm. An image height of 1.0H is 2.000 mm. An FOV is 20.48°. Thus, the camera optical lens 40 cannot satisfies design requirements of wide-angle, long-focal-length, and small distortion.

TABLE 17

| Parameters and conditions | Embodiment 1 | Embodiment 2 | Embodiment 3 | Comparative Embodiment |
|---|---|---|---|---|
| f | 8.07 | 8.50 | 8.15 | 8.20 |
| f/TTL | 1.12 | 1.10 | 1.06 | 0.83 |
| f1/f | 0.43 | 0.40 | 0.42 | 0.48 |
| f3/f4 | −1.10 | −0.40 | −0.89 | −0.63 |
| d2/d4 | 0.30 | 1.98 | 1.72 | 1.22 |
| f1 | 3.436 | 3.417 | 3.437 | 3.936 |
| f2 | −5.428 | −5.108 | −5.151 | −7.229 |
| f3 | −22.519 | −16.954 | −18.812 | −7.436 |
| f4 | 20.528 | 42.142 | 21.030 | 11.753 |
| f5 | −9.554 | −23.797 | −19.663 | 6.851 |
| f12 | 5.878 | 5.933 | 6.054 | 5.839 |
| FNO | 2.80 | 2.80 | 2.80 | 2.80 |
| TTL | 7.211 | 7.727 | 7.691 | 9.933 |
| IH | 2.000 | 2.000 | 2.000 | 2.000 |
| FOV | 27.56° | 26.30° | 27.31° | 20.48° |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens, comprising, from an object side to an image side in sequence: a first lens having a positive refractive power, a second lens having a negative refractive power, a third lens having a negative refractive power, a fourth lens having a positive refractive power, and a fifth lens having a refractive power; wherein the camera optical lens satisfies the following conditions:

$8.00 \leq f;$ $0.90 \leq f/TTL;$ $0.40 \leq f1/f \leq 0.85;$ $-1.10 \leq f3/f4 \leq -0.40;$ $0.30 \leq d2/d4 \leq 2.00;$ and $9.00 \leq R6/R5 \leq 30.00;$ where, f: a focal length of the camera optical lens;

f1: a focal length of the first lens;

f3: a focal length of the third lens;
f4: a focal length of the fourth lens;
TTL: a total optical length from the object side surface of the first lens of the camera optical lens to an image surface of the camera optical lens along an optical axis;
d2: an on-axis distance from an image side surface of the first lens to an object side surface of the second lens;
d4: an on-axis distance from an image side surface of the second lens to an object side surface of the third lens;
R5: a central curvature radius of the object side surface of the third lens; and
R6: a central curvature radius of an image side surface of the third lens.

2. The camera optical lens according to claim 1, wherein, the first lens has an object side surface being convex in a paraxial region and the image side surface of the first lens is convex in the paraxial region; the camera optical lens further satisfies the following conditions:

$$-1.72 \leq (R1+R2)/(R1-R2) \leq -0.48; \text{ and}$$

$$0.07 \leq d1/TTL \leq 0.25;$$

where,
R1: a central curvature radius of the object side surface of the first lens;
R2: a central curvature radius of the image side surface of the first lens;
d1: an on-axis thickness of the first lens; and
TTL: a total optical length from the object side surface of the first lens of the camera optical lens to an image surface of the camera optical lens along an optical axis.

3. The camera optical lens according to claim 1, wherein, the object side surface of the second lens is convex in a paraxial region and the image side surface of the second lens is concave in the paraxial region; the camera optical lens further satisfies the following conditions:

$$-1.34 \leq f2/f \leq -0.40;$$

$$1.17 \leq (R3+R4)/(R3-R4) \leq 3.84; \text{ and}$$

$$0.01 \leq d3/TTL \leq 0.05;$$

where,
f2: a focal length of the second lens;
R3: a central curvature radius of the object side surface of the second lens;
R4: a central curvature radius of the image side surface of the second lens;
d3: an on-axis thickness of the second lens; and
TTL: a total optical length from an object side surface of the first lens of the camera optical lens to an image surface of the camera optical lens along an optical axis.

4. The camera optical lens according to claim 1, wherein, the object side surface of the third lens is concave in a paraxial region, and the third lens has an image side surface being convex in the paraxial region; the camera optical lens further satisfies the following conditions:

$$-5.58 \leq f3/f \leq -1.33; \text{ and}$$

$$0.02 \leq d5/TTL \leq 0.07;$$

where,
d5: an on-axis thickness of the third lens.

5. The camera optical lens according to claim 1, wherein, the fourth lens has an object side surface being concave in a paraxial region, and an image side surface being convex in the paraxial region; the camera optical lens further satisfies the following conditions:

$$1.27 \leq f4/f \leq 7.43;$$

$$4.43 \leq (R7+R8)/(R7-R8) \leq 48.10; \text{ and}$$

$$0.05 \leq d7/TTL \leq 0.16;$$

where,
R7: a central curvature radius of the object side surface of the fourth lens;
R8: a central curvature radius of the image side surface of the fourth lens;
d7: an on-axis thickness of the fourth lens; and
TTL: a total optical length from an object side surface of the first lens of the camera optical lens to an image surface of the camera optical lens along an optical axis.

6. The camera optical lens according to claim 1, wherein, the fifth lens has an object side surface being concave in a paraxial region, an image side surface being convex in the paraxial region;
the camera optical lens further satisfies the following conditions:

$$-5.60 \leq f5/f \leq -0.79;$$

$$-4.43 \leq (R9+R10)/(R9-R10) \leq -0.72; \text{ and}$$

$$0.03 \leq d9/TTL \leq 0.16;$$

where,
f5: a focal length of the fifth lens;
R9: a central curvature radius of the object side surface of the fifth lens;
R10: a central curvature radius of the image side surface of the fifth lens;
d9: an on-axis thickness of the fifth lens; and
TTL: a total optical length from an object side surface of the first lens of the camera optical lens to an image surface of the camera optical lens along an optical axis.

7. The camera optical lens according to claim 1 further satisfying the following condition:

$$f/IH \geq 4.00;$$

where,
IH: an image height of the camera optical lens.

8. The camera optical lens according to claim 1, wherein, the camera optical lens further comprise a reflecting surface arranged at an end of the first lens away from the second lens; the reflecting surface is configured for reflecting and deflecting an entry light.

9. The camera optical lens according to claim 8, wherein, the reflecting surface is formed by a prism.

* * * * *